United States Patent
Morita

[19]

[11] Patent Number: 6,109,909
[45] Date of Patent: Aug. 29, 2000

[54] PRE-PLASTICIZING INJECTION APPARATUS HAVING A PLURALITY OF HEATING AND INJECTING CYLINDERS AND INJECTION MOLDING METHOD OF USING THE SAME

[75] Inventor: Ryozo Morita, Nagoya, Japan

[73] Assignee: Kabushiki Kaisha Meiki Seisakusho, Japan

[21] Appl. No.: 09/166,329

[22] Filed: Oct. 5, 1998

[30] Foreign Application Priority Data

Oct. 13, 1997 [JP] Japan .................................. 9-278875

[51] Int. Cl.[7] .......................... B29C 45/18; B29C 45/76
[52] U.S. Cl. ...................... 425/557; 425/217; 264/328.19
[58] Field of Search ................................... 425/557, 558, 425/559, 560, 561, 215, 216, 217, DIG. 1; 264/328.19

[56] References Cited

U.S. PATENT DOCUMENTS

| | | | |
|---|---|---|---|
| 3,268,636 | 8/1966 | Angell, Jr. | 264/51 |
| 3,876,736 | 4/1975 | Takiura | 264/40 |
| 4,124,308 | 11/1978 | Sokolow | 366/77 |
| 4,390,332 | 6/1983 | Hendry | 425/4 |
| 5,160,466 | 11/1992 | Allan et al. | 264/69 |
| 5,454,995 | 10/1995 | Rusconi et al. | 264/328.8 |
| 5,543,092 | 8/1996 | Ibar | 264/40.1 |
| 5,968,429 | 10/1999 | Treece et al. | 264/102 |

FOREIGN PATENT DOCUMENTS 48-18351 8/1973 Japan .
2-121913 4/1990 Japan .

*Primary Examiner*—Harold Pyon
*Assistant Examiner*—Emmanuel Luk
*Attorney, Agent, or Firm*—Wall Marjama Bilinski & Burr

[57] ABSTRACT

A pre-plasticizing injection apparatus operated with a mold clamped by a mold clamping device comprises: a screw device movable toward and away from the mold clamping device and including a heat-plasticizing cylinder having a bore and a screw which rotatably extends through the bore, so that a resin material introduced into the heat-plasticizing cylinder is fed by rotation of the screw to one axial end of the heat-plasticizing cylinder, while being plasticized, and is ejected from the axial end; and a plunger device movable toward and away from the mold clamping device and including a plurality of heating and injecting cylinders and an injection nozzle which is connectable to the mold, each heating and injecting cylinders being operated to store therein the resin material plasticized by the screw device, while being operated to inject the resin material through the injection nozzle into the mold; and a switching valve device which permits the screw device to be connected to at least one of the plurality of the heating and injecting cylinders to supply the resin material from the screw device to the cylinder, while at the same time permitting the injection nozzle to be connected to at least one of the rest of the plurality of heating and injecting cylinders to inject the resin material store in the cylinder through the injection nozzle into the mold. An injection molding method using the injection apparatus is also disclosed.

9 Claims, 6 Drawing Sheets

PRE-PLASTICIZING INJECTION APPARATUS HAVING A PLURALITY OF HEATING AND INJECTING CYLINDERS AND INJECTION MOLDING METHOD OF USING THE SAME

This application is based on Japanese Patent Application No. 9-278875 filed on Oct. 13, 1997, the content of which is incorporated hereinto by reference.

BACKGROUND OF THE INVENTION

1. Field of the Invention

The present invention relates in general to techniques associated with a pre-plasticizing injection apparatus in which a process of plasticizing a resin material and a process of ejecting or injecting the resin material is separately performed, more precisely, techniques relating to a screw type pre-plasticizing injection apparatus including a heat-plasticizing cylinder having a screw, and a plurality of heating and injecting cylinders each having a plunger, and an injection molding method using the pre-plasticizing injection apparatus.

2. Discussing of the Related Art

As one type of the pre-plasticizing injection apparatus, there is known an apparatus of the screw type which includes a single heat-plasticizing cylinder having a screw and a single heating and injecting cylinder having a plunger, as disclosed in JP-A-48-18351 and JP-U-2-121913. Such a screw type pre-plasticizing injection apparatus has been widely used because of its excellent capacity of plasticizing a resin material and its excellent uniformity of quality of the plasticized resin material.

In such a pre-plasticizing injection apparatus, as disclosed in the above mentioned documents, the resin material is supplied to the heat-plasticizing cylinder from one axial end portion of the heat-plasticizing cylinder. The resin material is transferred to the other axial end portion of the heat-plasticizing cylinder, as the screw is rotated about its axis of rotation, while the resin material is heated to be molten or plasticized. The plasticized resin material is ejected from the above indicated other axial end portion of the heat-plasticizing cylinder and introduced into the heating and injecting cylinder through one of its axial ends. As the resin material is delivered into the heating and injecting cylinder, the plunger of the heating and injecting cylinder is moved from its fully advanced position toward its fully retracted portion, whereby the heating and injecting cylinder is filled with the resin material. Thus, the resin material is stored in the heating and injecting cylinder. Then, the plunger of the heating and injecting cylinder is moved toward the fully advanced portion for injecting the resin material through an injection nozzle into a mold cavity of a mold which is clamped by a suitable clamping device.

However, the conventional pre-plasticizing injection apparatus requires a relatively long cycle time of injection molding, since the resin material is injected into the mold cavity after the resin material is plasticized in the heat-plasticizing cylinder and is then fed into and stored in the heating and injecting cylinder. In particular, when the resin material is injected from the heating and injecting cylinder into the mold cavity, ejection of the resin material from the heat-plasticized cylinder is necessarily interrupted, resulting in difficulty of improving injection molding efficiency of the injection apparatus.

Moreover, in the conventional pre-plasticizing injection apparatus, the resin material is fed into the heating and injecting cylinder through a passage formed in its end portion. In this arrangement, a mass of the resin material which is initially introduced into the heating and injecting cylinder is finally ejected from the heating and injecting cylinder, leading to unfavorable staying of the initially introduced mass in the heating and injecting cylinder, resulting in deterioration of the quality of an article produced by injection molding. In this respect, it is noted that an amount of the resin material stored in the heating and injecting cylinder is determined to be larger than that of the resin material required for filling the mold cavity by a predetermined surplus amount, for preventing possible insufficient supply of the resin material to the mold cavity. Accordingly, the surplus amount of the resin material tends to remain in the heating and injecting cylinder after the completion of the injecting operation of the resin material. The quality of the resin material remaining in the heating and injecting cylinder is significantly deteriorated.

SUMMARY OF THE INVENTION

It is therefore a first object of the present invention to provide a pre-plasticizing injection apparatus which exhibits an excellent material injection efficiency.

It is a second object of the present invention to provide a pre-plasticizing injection apparatus which is capable of preventing or eliminating the problem of the resin material remaining in the heating and injecting cylinder.

It is a third object of the present invention to provide a method of injection molding using a pre-plasticizing injection apparatus according to the present invention, which method is capable of molding a product of a resin material with an improved molding efficiency.

It is a fourth object of the present invention to provide a method of injection molding using a pre-plasticizing injection apparatus according to the present invention, which method is capable of eliminating or reducing the problem of deterioration of the quality of the resin material due to unfavorable stay of the resin material in the heating and injecting cylinder.

The first object of the present invention may be achieved according to a first aspect of the principle of this invention, which provides a pre-plasticizing injection apparatus operated with a mold clamped by a mold clamping device comprising: a screw device movable toward and away from the mold clamping device and including a heat-plasticizing cylinder having a center bore to which a resin material is supplied, and a screw which extends through the center bore of the heat-plasticizing cylinder such that the screw is rotated to feed the resin material to one of opposite axial ends of the heat-plasticizing cylinder such that the resin material is heated and thus plasticized within the center bore of the heat-plasticizing cylinder, and the plasticized resin material is ejected from the one axial end of the heat-plasticizing cylinder; a plunger device movable toward and away from the mold clamping device and including a plurality of heating and injecting cylinders each having a center bore and a plunger axially slidably received in the center bore, and an injection nozzle which is connectable at one of opposite end portions thereof to the mold, each of the plurality of heating and injecting cylinders being operated to store therein the resin material plasticized by the screw device by a retracting movement of the corresponding plunger, and to eject the resin material stored therein, through the injection nozzle, by an advancing movement of the corresponding plunger toward one of opposite axial ends of the corresponding heating and injecting cylinder; and a switching valve device which permits the screw device to be successively connected to at least one of the plurality of the heating and injecting cylinders so that said resin material ejected from the screw device to is supplied into and stored in the at least one of the heating and injecting cylinders, while at the same time permitting the injection nozzle to be successively connected to at least one of the rest of the plurality of heating and injecting cylinders which is not connected to the screw device, so that the resin material stored in the at least one of the rest of the plurality of heating and injecting cylinders is injected through the injection nozzle into the mold.

The pre-plasticizing injection apparatus constructed according to the present invention is positioned with respect to the mold clamping device, which clamps the member of the mold to the stationary member thereof such that the injection nozzle of the plunger device is brought into communication at one of its opposite ends to the sprue leading to the cavity of the mold. The screw of the screw device is rotated about its axis so that the resin material is forced to be fed to the outlet end of the heat-plasticized cylinder, while the resin material is heated to be plasticized in the heat-plasticized cylinder. The plasticized resin material is then discharged from the heat-plasticizing cylinder into at least one of the heating and injecting cylinders of the plunger device. As the plunger of each of the at least one heating and injecting cylinder is retracted, the resin material is stored in the heating and injecting cylinder. Then, the plunger is advanced, so that the resin material is injected from the heat injection cylinder into the mold cavity of the mold clamped by the mold clamping device, so that the mold cavity is filled with the resin material.

In the injection apparatus constructed according to the present invention, the plunger device is provided with the two or more heating and injecting cylinders. At least one of these heating and injecting cylinders is successively connected to the injection nozzle so as to inject the resin material into the mold cavity of the mold. Simultaneously, at least one of the rest of the heating and injecting cylinders is successively connected to the screw device so that the resin material is supplied from the screw device into the at least one of the rest of the heating and injecting cylinders. In this case, the number of the heating and injecting cylinders connected to the injection nozzle is equal to that of the heating and injecting cylinders connected to the screw device.

Namely, the injection apparatus constructed according to the present invention is adapted such that at least one of the plurality of heating and injecting cylinders is operated to eject the resin material, while at least one other heating and injecting cylinders is operated to store the resin material. That is, the plurality of heating and injecting cylinders are successively operated to inject the resin material into the mold cavity, without a relatively long non-productive time conventionally required for loading the heating and injecting cylinders with the resin material. Accordingly, the injection molding efficiency of the present injection apparatus can be significantly improved, since the step of loading or supplying the heating and injecting cylinders with the resin material is effected concurrently with the step of injecting the resin material into the mold cavity. In the conventional injection apparatus having a single heating and injecting cylinder, the injecting step is initiated only after the loading step is completed.

According to the injection apparatus of the present invention, the conventionally used heat-plasticizing cylinder and the conventionally used heating and injecting cylinder can be used as the heat-plasticizing cylinder of the screw device and the heating and injecting cylinders of the plunger device. For instance, the heat-plasticizing cylinder is constructed such that a material supplying hole for introducing the resin material into the heat-plasticizing cylinder is formed at an axial end or axially middle portion thereof which is distant from the other axial end through which the resin material is discharged into the plunger device. On the other hand, the plunger device may be constructed with a passage formed at one of the axial ends of each heating and injecting cylinder, so that the resin material is supplied from the screw device into the heating and injecting cylinder while the plunger is retracted. The resin material is ejected from the heating and injecting cylinder by an advancing movement of the plunger.

The above-indicated second object as well as the first object may be achieved according to a first preferred form of the first aspect of the present invention, wherein the plunger device further has a communication passage which permits temporary communication between the at least one of the plurality of heating and injecting cylinders which has been operated to eject the resin material stored therein and the at least one of the rest of the plurality of heating and injecting cylinders which is to be operated to eject the resin material, so that the resin material is transferable between the plurality of heating and injecting cylinders communicated with each other by the communication passage.

In the injection apparatus constructed according to the first preferred form of the first aspect of the invention, a surplus amount of the resin material which remains in each heating and injecting cylinder which has been connected to the injection nozzle can be transferred to the heating and injecting cylinder which has been connected to the screw device and which is then connected to the injection nozzle. Accordingly, a long stay of the surplus resin material in the heating and injecting cylinder after the injecting operation is effectively prevented, resulting in preventing deterioration of the quality of the resin material due to the long or permanent stay of the resin material in the heating and injecting cylinder.

According to a second preferred form of the first aspect of the present invention, the screw of the screw device is a reciprocating screw which is reciprocally movable in the axial direction.

In the injection apparatus constructed according to the second preferred form of the first aspect of the present invention, the resin material plasticized in the heat-plasticizing cylinder can be stored in an outlet end portion of that cylinder, while the reciprocating screw is moved backward in a direction away from the outlet end portion and is kept rotated, even when none of the heating and injecting cylinders is allowed to be connected to the screw device, resulting in a further improved efficiency of the injection molding using the present injection apparatus.

According to a third preferred form of the first aspect of the present invention, the screw device and the plunger device are movable independently of each other toward and away from each other and the mold clamping device.

In the injection apparatus constructed according to the third preferred form of the first aspect of the present invention, each of the screw device and the plunger device is quickly and easily movable relative to each other and the mold clamping device. Moreover, the operating efficiency for accurate positioning of the injection nozzle of the plunger device with respect to the mold claiming device can be effectively improved.

In one advantageous arrangement of the above second preferred form of the first aspect of the present invention, the plunger device is removable alone away from the mold clamping device and the screw device, and the heat-plasticizing cylinder of the screw device is connectable directly to the mold with the plunger device removed, so as to provide an injection apparatus of in-line screw type.

In the injection apparatus constructed according to the advantageous arrangement of the second preferred form of the first aspect of the present invention, the plasticizing and injecting operations of the resin material can be performed only by the screw device. The injection apparatus can be selectively usable as a pre-plasticizing injection apparatus or a in-line screw type injection apparatus, depending upon the kind of the resin materials and type of products to be produced.

According to a fourth preferred form of the first aspect of the present invention, the heat-plasticizing cylinder of the screw device is disposed such that an axis of the heat-plasticizing cylinder is parallel to a direction of movement of the screw device relative to the mold clamping device, and the plurality of heating and injecting cylinders of the plunger device consist of a first heating and injecting cylinder and a second heating and injecting cylinder which are disposed coaxially with each other such that axes of the first and second heating and injecting cylinders are perpendicular to a direction of movement of the plunger device relative to the mold clamping device, the plunger device having a first and a second resin flow passage which communicate with said first and second heating and injecting cylinders, respectively, each of the first and second resin flow passages being formed at said one of the opposite axial ends of the corresponding heating and injection cylinder, the plunger device further having a resin inlet passage for communicating with said screw device, and a resin outlet passage communicating with said injecting nozzle, said first and second resin flow passage, said resin inlet passages and said resin outlet passage being arranged so as to extend along respective radial lines which intersect each other at a single point of intersection, the switching valve device comprising a rotary valve which is rotatable about an axis of rotation thereof passing the point of intersection, so as to alternatively connect the resin inlet passage to one of the first and second resin flow passages, while alternatively connecting the resin outlet passage to the other one of the first and second resin flow passages, depending upon an angular position of the rotary valve about its axis.

In the injection apparatus constructed according to the fourth preferred form of the first aspect of the present invention, the pre-plasticizing cylinder and the first and the second heating and injecting cylinders are disposed with improved space utilization. Especially, the pre-plasticizing cylinder may be spaced apart from the first and the second heating and injecting cylinders, facilitating inspection, repairing and replacement of these cylinders. Moreover, the single rotary valve having a simple construction is used as the switching valve device, permitting easy selective connection of the passages indicated above.

The third object of the present invention may be achieved according to a second aspect of the principle of the present invention, which provides a method of performing successive injection molding operations using a pre-plasticizing injection apparatus according to claim 1, comprising the steps of: supplying the resin material from the heat-plasticizing cylinder of the screw device to the at least one of the plurality of heating and injecting cylinders so as to store the resin material therein; and injecting the resin material from the at least one of the rest of the plurality of heating and injecting cylinders into said mold, the steps of supplying and injecting said resin material being simultaneously performed such that each of said plurality of heating and injecting cylinders which has been operated to store the resin material is then operated to inject said resin material into the mold.

In the method according to the second aspect of the invention, one or more of the plurality of heating and injecting cylinders is/are used for injecting the resin material into the mold, while the other heating and injecting cylinder or cylinders is/are used for storing the resin material. Namely, at least one of the plurality of heating and injecting cylinders is operated to inject the resin material into the mold, while at least one of the rest of the plurality of heating and injecting cylinders is operated to store the resin material. The latter heating and injecting cylinder or cylinders is/are then operated to inject the resin material stored therein into the mold. This arrangement eliminates the conventional need of plasticizing the resin material in the screw device and storing the resin material in the single heating and injecting cylinder, before initiating the operation to inject the resin material into the mold. Accordingly, the cycle time of the injection molding operation is shortened in the injection apparatus of the present invention.

The fourth object as well as the third object of the present invention may be achieved according to a third aspect of the principle of the present invention, which provides a method of performing successive injection molding operations using a pre-plasticizing injection device according to claim 2, comprising the steps of: supplying the resin material from the heat-plasticizing cylinder of the screw device to the at least one of the plurality of heating and injecting cylinders so as to store the resin material therein; injecting the resin material from the at least one of the rest of the plurality of heating and injecting cylinders into the mold; and transferring a surplus amount of the resin material remaining the heating and injecting cylinder which has been operated to inject the resin material into the mold to the heating and injecting cylinder which is currently used to store the resin material, through the communication passage, the steps of supplying and ejecting the resin material being simultaneously performed such that each of the plurality of heating and injecting cylinder which has been operated to store the resin material is then operated to inject the resin material into the mold, the step of transferring the resin material being performed after the step of injecting the resin material is completed.

In the method according to the third aspect of the invention, the surplus or residual amount of the resin material which remains in each heating and injecting cylinder which has been operated to inject the resin material into the mold is transferred through the communication passage to each heating and injecting cylinder which has been operated to store the resin material. This arrangement prevents deterioration of the resin material by heat due to a long stay of the surplus amount in the heating and injecting cylinders. Moreover, the surplus resin material is transferred to the heating and injecting cylinder in which a suitable amount of the resin material has already been stored, so that the surplus resin material transferred to the heating and injecting cylinder is effectively injected first in the injection operation, resulting in shortening the time during which the surplus amount of the resin material is stored in the heating and injecting cylinder. Accordingly, the time during which the surplus resin material is exposed to the heat in the heating and injecting cylinder can be remarkably shortened, making it possible to eliminate and prevent the conventionally experienced problem of deteriorated quality of the resin material.

BRIEF DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which.

DETAILED DESCRIPTION OF THE PREFERRED EMBODIMENTS

Figure 1:
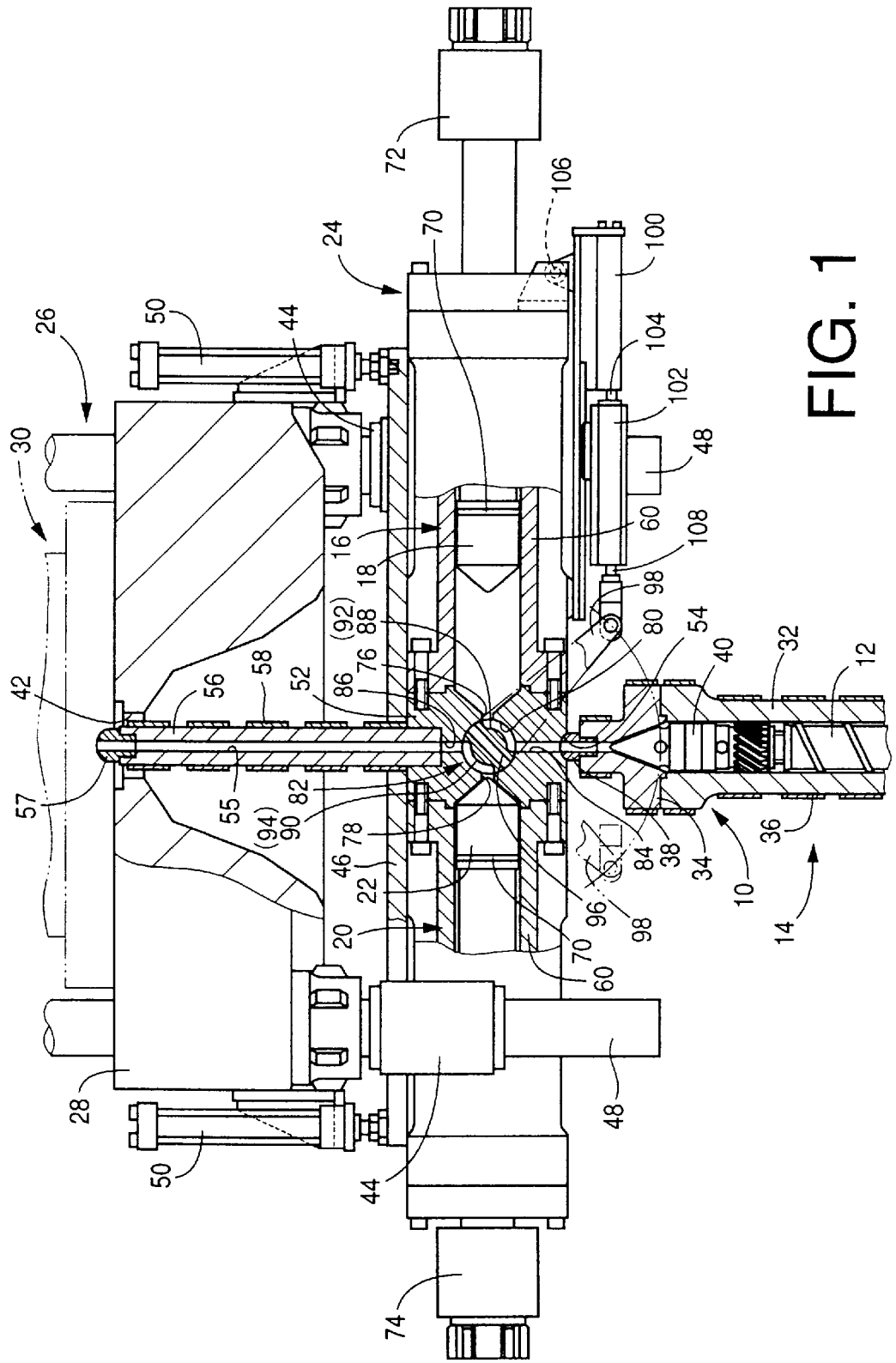
FIG. 1 is a horizontal cross sectional view of a part of a pre-plasticizing injection apparatus constructed according to one preferred embodiment of the present invention.

Referring first to FIG. 1, there is schematically shown a part of a pre-plasticizing injection apparatus constructed according to one preferred embodiment of the present invention. The injection apparatus includes a screw device 14 and a plunger device 24. The screw device 14 includes a heat-plasticizing cylinder 10 having a center bore, and a screw 12 which is rotatably received in and extend through the center bore of the heat-plasticizing cylinder 10, while the plunger device 24 includes a first heating and injecting cylinder 16 having a first plunger 18 and a second heating and injecting cylinder 20 having a second plunger 22. The screw device 14 and the plunger device 24 are disposed relative to a stationary member 28 of a mold clamping device 26 such that these two devices 14, 24 and the stationary member 28 are co-axial to each other and such that the screw device 14 and the plunger device 24 are movable independently of each other and toward and away from the stationary member 28. A resin material is supplied to the center bore of the heat-plasticizing cylinder 10 and is plasticized therein, and is then introduced into and stored in the first and second heating and injecting cylinders 16 and 20. The resin material stored in the first and second heating and injecting cylinders 16 and 20 is then injected into a mold cavity of a mold 30 fixed to the mold clamping device 26, so as to fill the mold cavity with the resin material, thereby obtaining a desired product of the resin material by injection molding.

For the screw device 14, a conventional screw device, such as an in-line screw type injection device may be employed. In this case, the heat-plasticizing cylinder 10 of the screw device 14 consists of a cylindrical member 32 having a relatively large wall thickness and a nozzle member 34 which is fixed to one of axial open ends of the cylindrical member 32. Through the other axial open end of the cylindrical member 32, the screw 12 is inserted into and disposed within the cylindrical member 32. On the outer circumferential surfaces of the cylindrical member 32 and the nozzle member 34, there are bonded a plurality of band heaters 36. To one of the axial ends of the nozzle member 34 which is remote from the cylindrical member 32, there is fixed a nozzle chip 38 having an outlet hole through which the resin material is ejected. The heat-plasticizing cylinder 10 and the screw 12 are fixedly supported on a slide (not shown) which is reciprocally movable in the axial direction of the cylinder 10 and the screw 12, whereby the heat-plasticizing cylinder 10 and the screw 12 are movable toward and away from the mold clamping device 26. The screw 12 is driven to rotate about its axis of rotation by a hydraulic motor, within the heat-plasticizing cylinder 10. As the screw 12 is rotated in the heat-plasticizing cylinder 10, the resin material which is introduced into the heat-plasticizing cylinder 10 at an axially middle portion of the heat-plasticizing cylinder 10 is heated to be plasticized, while being transferred to the nozzle member 34. The resin material transferred to the nozzle member 34 is discharged through the outlet hole of the nozzle member 34. The screw 12 has a check valve 40 formed at its end portion adjacent to the nozzle member 32, so as to prevent a counter flow of the resin material in the direction away from the nozzle member 32.

The screw device 14 is movable toward and away from the mold clamping device 26. For the mold clamping device 26, a conventional clamping device used in a known injection molding apparatus may be employed. The mold clamping device 26 has a known structure, namely, includes the stationary member 28, and a movable member (not shown) which is disposed to be opposed to the stationary member 28. A stationary mold half 30 is fixed to the stationary member 28 of the mold clamping device 26, while a movable mold half (not shown) is fixed to the movable member of the mold clamping device 26. The movable member is reciprocally moved toward and away from the stationary mold member 28 by a mold clamping cylinder (not shown), so that the movable mold half is moved toward and away from the stationary mold half 30. Thus, the mold has an open position and a closed position. The stationary mold member 28 and the mold clamping cylinder are fixedly disposed on a base of the apparatus such that the stationary mold member 28 and the mold clamping cylinder are opposite to each other with a suitable distance therebetween. Between the opposite surfaces of the stationary member 28 and the mold clamping cylinder, four tie rods 48 extend such that the tie rods 48 are parallel to each other and are spaced apart from each other by a suitable distance. The movable member of the clamping device is supported by the four tie rods 48, such that the movable member is movable toward and away from the stationary member 28 along the tie rods 48. The stationary member has a nozzle inserting bore 42 at its central portion, through which an injection nozzle 56 for ejecting the resin material is inserted.

Between the screw device 14 and the mold clamping device 26 which are opposite to each other with a suitable distance therebetween, there is disposed the plunger device 24. The plunger device 24 has a base plate 46 having a rectangular plate and provided with four slide bushings 44 fixed at four corners thereof. The tie rods 48 extend from the stationary member 28 of the mold clamping device 26 toward the screw device 14. The extensions of the tie rods 48 extend through the respective slide bushings 44. Thus, the base plate 46 is movable toward and away from the stationary member 28 in an axial direction of the tie rods 48. The stationary member 28 is provided with two positioning hydraulic cylinders 50, 50 fixed at its opposite side surfaces. The positioning hydraulic cylinders 50, 50 have respective piston rods each of which is fixed to the base plate 46 at one of its opposite end portions. The piston rods of the positioning hydraulic cylinders 50, 50 are reciprocally driven, so that the base plate 46 can be positioned relative to the the stationary member 28 by the positioning hydraulic cylinders 50, 50.

On a central portion of one of the major surfaces of the base plate 46, which surface is opposite to the screw device 14, there a center block 52 is fixed by a suitable fastening mechanism such as bolts. The center block 52 is positioned with respect to the screw device 14 and the mold clamping device 26 such that a center of the center block 52 is aligned with an extension line of the axis of the heat-plasticizing cylinder 10 extending toward the mold clamping device 26. In one of opposite major surfaces of the center block 52 which surface is opposite to the screw device 14, there is formed a nozzle seat portion 54 which is engageable with the nozzle member 34 of the heat-plasticizing cylinder 10. In the other major surface of the center block 52 which surface is opposite to the mold clamping device 26, there is formed a hole in which one of the opposite axial end portion of the injection nozzle 56 is fixed, such that the injection nozzle 56 extends through the base plate 46 into the nozzle inserting bore 42 of the mold clamping device 28. The injection nozzle is a cylindrical member having a center bore 55 for feeding the resin material therethrough. The injection nozzle 56 has an outlet member 57 fixed to the other its axial ends portions. The outlet member 57 is inserted into the end portions of the nozzle inserting bore 42 of the stationary member 28 so that the injection nozzle 56 is engageable with the opening of a sprue communicating with the mold cavity of the mold 30. A plurality of band heaters 58 are fixed on the outer circumferential surface of the injection nozzle 56 such that the band heaters 58 extend in the circumferential direction of the injection nozzle 56 at different axial portions of the injection nozzle 56.

To the opposite sides of the center block 52 which are opposed to each other in a direction perpendicular to the direction of movement of the base plate 46, there are bonded two cylindrical members 60, 60 each having a relatively large wall thickness are bonded, respectively. The cylindrical members 60, 60 provide parts of the first heating and injecting cylinder 16 and the second heating and injecting cylinder 20, respectively. That is, the axes of the first and second heating and injecting cylinders 16, 20 extend in the direction perpendicular to the direction of movement of the base plate 46. The first and the second heating and injecting cylinders 16, 20 further have a first plunger 18 and a second plunger 22, respectively. The first and second plungers 18, 22 are inserted from respective axial opposite ends of the first and second heating and injecting cylinders 16, 20 which ends are remote from the center block 52, and are slidably movable within respective bores of the first and second heating and injecting cylinders 16, 20. Each of the first and second plungers 18, 22 has a groove extending in its circumferential direction. This groove is formed in the outer circumferential surface of the inner end portions which is always located within the bore of the corresponding cylindrical member 60. In the grooves of the first and second plungers 18, 22, piston rings 70, 70 are respectively disposed so as to extend slightly radially outwardly of the plungers 18, 22. These piston rings 70, 70 provide fluid tightness relative to the cylindrical members 60, 60, while maintaining sufficiently large amount of clearance between the inner circumferential surfaces of the cylindrical member 60 and the outer circumferential surface of the corresponding plungers 18, 22.

To the center block 52, there are also fixed a first hydraulic cylinder mechanism and a second hydraulic cylinder mechanism (not shown) by which the first and the second plungers 18, 22 are reciprocally moved, respectively, within the bores of the respective cylindrical members 60, 60. More specifically described, the plungers 18, 22 extend out of the cylindrical members 60, 60, such that outer end portions 72, 74 of the plungers are located the outside the cylindrical members 60, 60. The first and the second cylinder mechanisms include respective cylinders and respective piston rods slidably movable in bores of the cylinders. These cylinders are fixed to the respective portions of the center block 52 and the piston rods extend parallel to the respective plungers 18 and 22. The piston rods of the first and the second hydraulic cylinder mechanisms are fixed to the respective outer end portions 72, 74 of the first and second plungers 18, 22. Thus, the first and second plungers 18, 22 are reciprocally movable through the cylindrical members 60, 60 in the axial direction.

The center block 52 has a valve receiving bore 80 which extends through its central portion in a vertical direction which is perpendicular to the plane of the cross sectional view of FIG. 1. The valve receiving bore 80 has a circular shape in the horizontal cross section as seen in FIG. 1 and receives a rotary valve 82 having a cylindrical shape. The center block 52 further has a first resin flow passage 76 and a second resin flow passage 78 which are formed on the opposite sides of the bore 80, at which the cylindrical members 60, 60 are bonded, respectively. The first and second resin flow passages 76, 78 extend in the axial direction of the cylindrical members 60, 60 such that each passage 76, 78 communicate with the valve receiving bore 80 and bore of the corresponding cylindrical member 60. The center block 52 also has a resin inlet passage 84 and a resin outlet passage 86 formed in its respective portions opposed to the screw device 14 and the mold clamping device 26, respectively. The resin inlet passage 84 extends from the nozzle seat portion 54 toward the central portion of the center block 52 in a direction parallel to the direction of the movement of the plunger device 24 relative to the stationary member 28, and is open in the inner circumferential surface of the valve receiving bore 80. The resin outlet passage 86 extends from the above indicated hole at which the injection nozzle 56 is fixed in the direction parallel to the direction of movement of the plunger device 24, and is open in the inner surface of the valve receiving bore 80. Specifically, in the center block 52, the first and second resin flow passages 76, 78, and the resin inlet and outlet passages 84, 86 are formed radially from the valve receiving bore 80 such that the openings of these passages in the inner circumferential surface of the valve receiving bore 80 are equally spaced apart from each other at an angular interval of 90° about the axis of the bore 80.

The rotary valve 82 has a first part-circumferential groove 88 and a second part-circumferential groove 90 formed in the outer circumferential surface of its axially middle portion in its circumferential direction. Each of these grooves has a length substantially equal to a quarter of the circumference of the rotary valve 82. The first-part and second-part circumferential grooves 88, 90 are opposite to each other in a first diametrical direction of the rotary valve 82, and are closed by the inner surface of the valve receiving bore 80, so that there are formed a first connecting passage 92 and a second connecting passage 94. The rotary valve 82 also has a communication passage in the form of a diametrical connecting passage 96 which extends through the inside of the rotary valve 82 in a second diametrical direction of the rotary valve 82 which is perpendicular to the first diametrical direction indicated above. The connecting passage 96 is open in the outer circumferential surface of the rotary valve 82 at two diametrically opposite portions which are interposed between the adjacent ones of the circumferential opposite ends of the first and second grooves 88, 90. Depending upon the selected one of predetermined rotational or angular portions of the rotary valve 82, the first and second connecting passages 92, 94 permit selective connection between two of the first and second resin flow passages 76, 78 and the resin inlet and outlet passages 84, 86, which two passages are open in the inner circumferential surface of the valve receiving bore 80 at the respective positions which are adjacent in the circumferential direction of the valve receiving bore 80. Depending upon the selected angular position of the rotary valve 82, the diametrical connecting passage 96 permits selective connection between two of these passages 76, 78, 84, 86 which are open in the inner circumferential surface of the valve receiving bore 80 at the respective positions which are opposite to each other in the diametrical direction of the valve receiving bore 80.

One axial opposite end of the rotary valve 82 is fixed to a driving arm 98 which is connected to a first valve actuating hydraulic cylinder 100 and a second valve actuating hydraulic cylinder 102, so that the rotary valve 82 is driven to rotate about its axis by the first and the second valve actuating hydraulic cylinders 100, 102 via the driving arm 98. More specifically described, the first valve actuating hydraulic cylinder 100 is supported by a support shaft 106 such that the hydraulic cylinder 100 is rotatable about the shaft 106. The support shaft 106 is fixed to the first heating and injecting cylinder 16. The second valve actuating hydraulic cylinder 102 is supported by the first heating and injecting cylinder 16 such that the hydraulic cylinder 102 is slidable in the axial direction of the first valve actuating hydraulic cylinder 100. A piston rod 104 of the first valve actuating hydraulic cylinder 100 is fixed to the second valve actuating hydraulic cylinder 102, while a piston rod 108 of the second valve actuating hydraulic cylinder 102 is connected to the driving arm 98. In this arrangement, the rotary valve 82 is rotated by the first and the second valve actuating hydraulic cylinders 100, 102 to the selected one of the predetermined angular positions, which are equally spaced apart from each other at an angular interval of 45° about the axis of the rotary vale 82.

Figure 2:
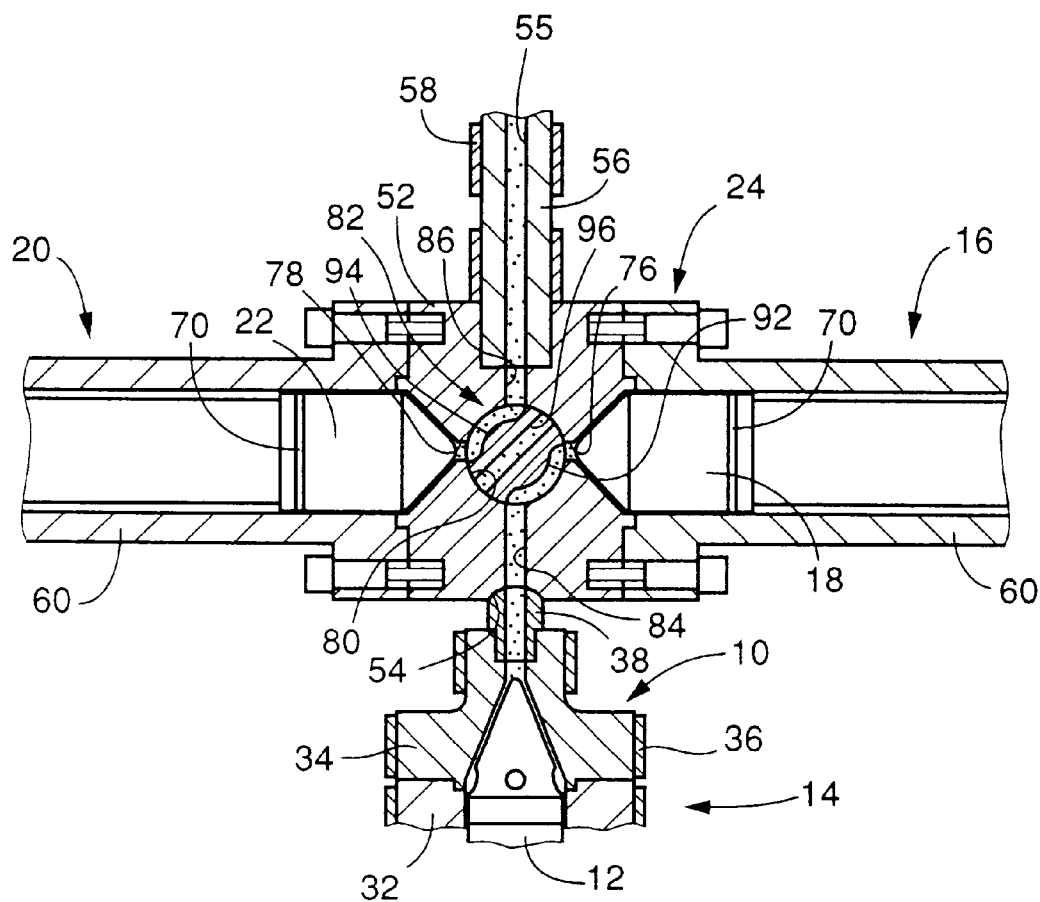
FIG. 2 is an enlarged view in horizontal cross section of the pre-plasticizing injection apparatus as shown in FIG. 1, showing one step of injection molding using the pre-plasticizing injection apparatus.

The pre-plasticizing injection molding apparatus constructed according to the preferred embodiment of the present invention as described above can provide a desired resin product. Initially, the plunger device 24 is moved toward the mold clamping device 26 so that the outlet member 57 of the injection nozzle 56 is brought into communication with the mold cavity in the mold 30 clamped by the mold clamping device 26, while the screw device 14 is also moved toward the mold clamping device 26 so that the nozzle chip 38 of the nozzle member 34 is brought into communication with the nozzle seat portion 54 of the plunger device 24, as shown in FIG. 2. In the plunger device 24, the first and second plungers 18 and 22 of the respective first and the second heating and injecting cylinders 16, 20 are moved to their advanced positions (at the axial ends of the respective cylinders 16, 20 on the opposite sides of the center block 52), while the rotary valve 82 is rotated to the angular position in which the first connecting passage 92 connects the resin inlet passage 84 and the first resin flow passage 76, as also shown in FIG. 2. The plunger device 24 has position sensors for detecting the positions of the first and second plungers 18, 22 so as to control the movements of the first and second plungers 18, 22.

With the rotary valve 82 placed in the above described angular position, the screw 14 is rotated within cylindrical member 32 of the heat-plasticizing cylinder 10, while the resin material is supplied into the heat-plasticizing cylinder 10. As the screw 14 is rotated, the resin material is fed toward the nozzle member 34, while the resin material is heated by the heat generated by the band heaters 36 and by the rotation of the screw 12, whereby, the resin material is effectively plasticized and well mixed or kneaded within the heat-plasticizing cylinder 10. The plasticized resin material is ejected through the nozzle member 34, and is introduced into the first heating and injecting cylinder 16 through the resin inlet passage 84, first connecting passage 92 and first resin flow passage 76 in the order of description. In the first heating and injecting cylinder 16, the first plunger 18 is forced to move backward away from the first resin flow passage 76 under a pressure of the plasticized resin material fed into the first heating and injecting cylinder 16, so that the plasticized resin material is stored in the first heating and injecting cylinder 16. This step of supplying the plasticized resin material into the first heating and injecting cylinder 16 is terminated when the position sensor detects that the first plunger 18 has been moved to the predetermined retracted position so that a predetermined amount of the resin material is stored in the first heating and injecting cylinder 16.

Figure 3:
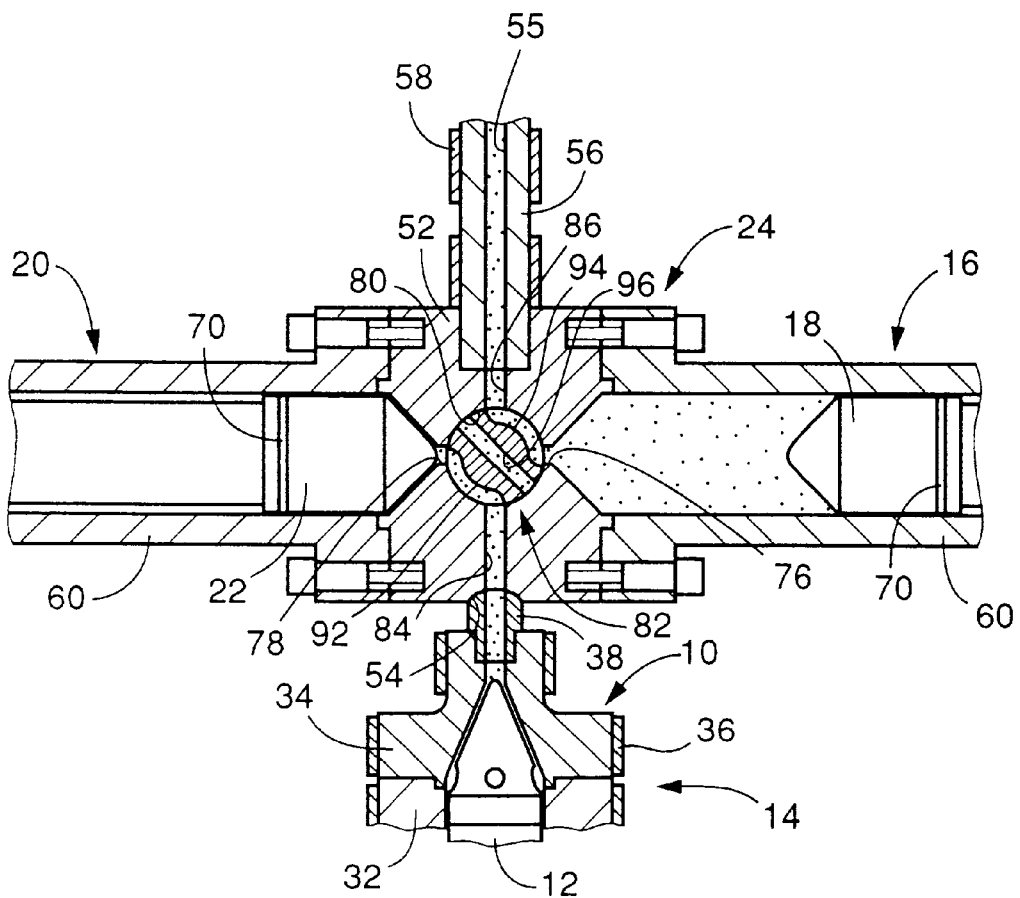
FIG. 3 is an enlarged view corresponding to that of FIG. 2, showing another step of injection molding following the step of FIG. 2.

Referring next to FIG. 3, there is shown the next step of the injection molding using the present pre-plasticizing injection apparatus according to the preferred embodiment of the present invention, in which the rotary valve 82 is rotated by 90° about its axis to the predetermined angular position of FIG. 3. The rotary valve 82 placed in this angular position permits the connection between the resin inlet passage 84 and the second resin flow passage 78 via the first connecting passage 92, while at the same time permitting the connection between the first resin flow passage 76 and the resin outlet passage 86 via the second connecting passage 94. In this condition, the first plunger 18 is advanced by the first hydraulic cylinder mechanism toward the first resin flow passage 76 within the cylindrical member 60 of the first heat-plasticized cylinder 16, so that the plasticized resin material stored in the heat-plasticized cylinder 16 is forced and injected from the sprue 55 of the injection nozzle 56 into the mold cavity of the mold 30, through the first resin flow passage 76, second connecting passage 94 and resin outlet passage 86 in the order of the description.

While the resin material is injected from the injection nozzle 56 into the mold cavity of the mold 30, the screw device 14 is also operated to plasticize and eject the resin material, so that the plasticized resin material is ejected through the nozzle member 34 of the screw device 14 and is fed into the second heating and injecting cylinder 20 through the resin inlet passage 84 and the second resin flow passage 78 which are connected via the first circumferential connection passage 92 of the rotary valve 82 as described above. In the second heating and injecting cylinder 20, the second plunger 22 is forced to move backward away from the second resin flow passage 78 under a pressure of the plasticized resin material fed into the second heating and injecting cylinder 20, so that the plasticized resin material is stored in the second heating and injecting cylinder 20. Thus, the step of injecting the resin material into the mold cavity of the mold by the first heating and injecting cylinder 16 and the step of supplying the resin material into the second heating and injecting cylinder 20 are simultaneously performed.

The amount of the resin material stored in the first heating and injecting cylinder 16 is determined to be larger than that of the resin material required for filling the mold cavity of the mold 30 by a suitable amount i.e., by a so-called "surplus amount". Accordingly, when the step of injecting the plasticized resin material from the first heating and plasticizing cylinder 16 into the mold cavity of the mold 30 is terminated, the first plunger 18 is located at a predetermined injection-terminating position which is spaced from the fully advanced position of FIG. 2 by a distance δ in the axial direction. When the plunger position sensor detects that the first plunger 18 has been advanced to the predetermined injection-terminating position upon termination of the resin material injection step, the backward movement of the second plunger 22, namely the step of supplying the plasticized resin material from the screw device 14 into the second heating and injecting cylinder 20 is suspended or interrupted. At this time, the second plunger 22 is located at a resin supply interrupting position which is spaced from its fully retracted position by a suitable axial distance which is not smaller than the axial distance δ indicated above.

Figure 5:
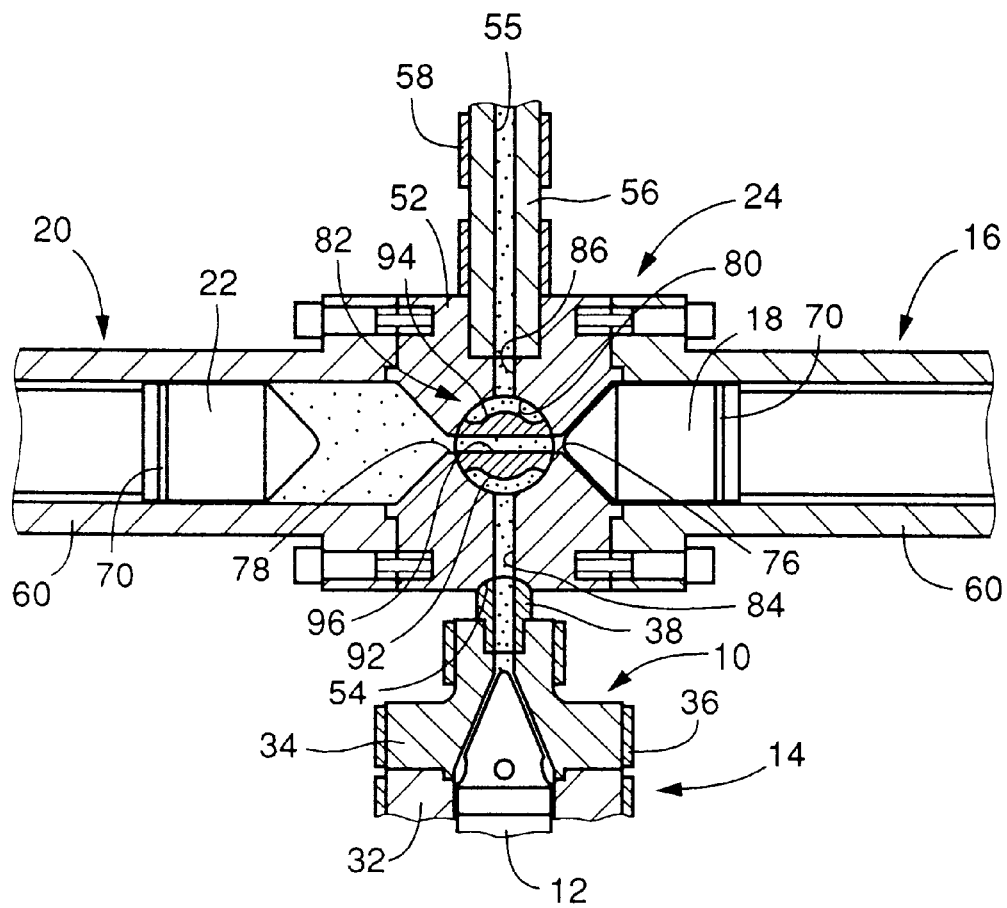
FIG. 5 is an enlarged view corresponding to that of FIG. 2, showing still further step of injection molding following the step of FIG. 4.

Then, the rotary valve 82 is rotated by 45° about its axis so as to connect the first and second heating and injecting cylinders 16, 20 via the diametrical connecting passage 96, as shown in FIG. 5. With the first and second heating and injecting cylinders 16, 20 connected to each other, the first plunger 18 is advanced by the first hydraulic cylinder mechanism to the fully advanced position so that the surplus amount of the resin material remaining within the first heating and injecting cylinder 16 is transferred into the second heating and injecting cylinder 20 through the diametrical connecting passage 96 and the first and second resin flow passages 76, 78. Thus, the resin material is stored in the second heating and injecting cylinder 20, as the second plunger 22 is moved backwardly toward its fully retracted position. As is apparent from the following description, this arrangement eliminates the conventionally experienced problem of the resin material remaining in the heating and injecting cylinders.

Figure 4:
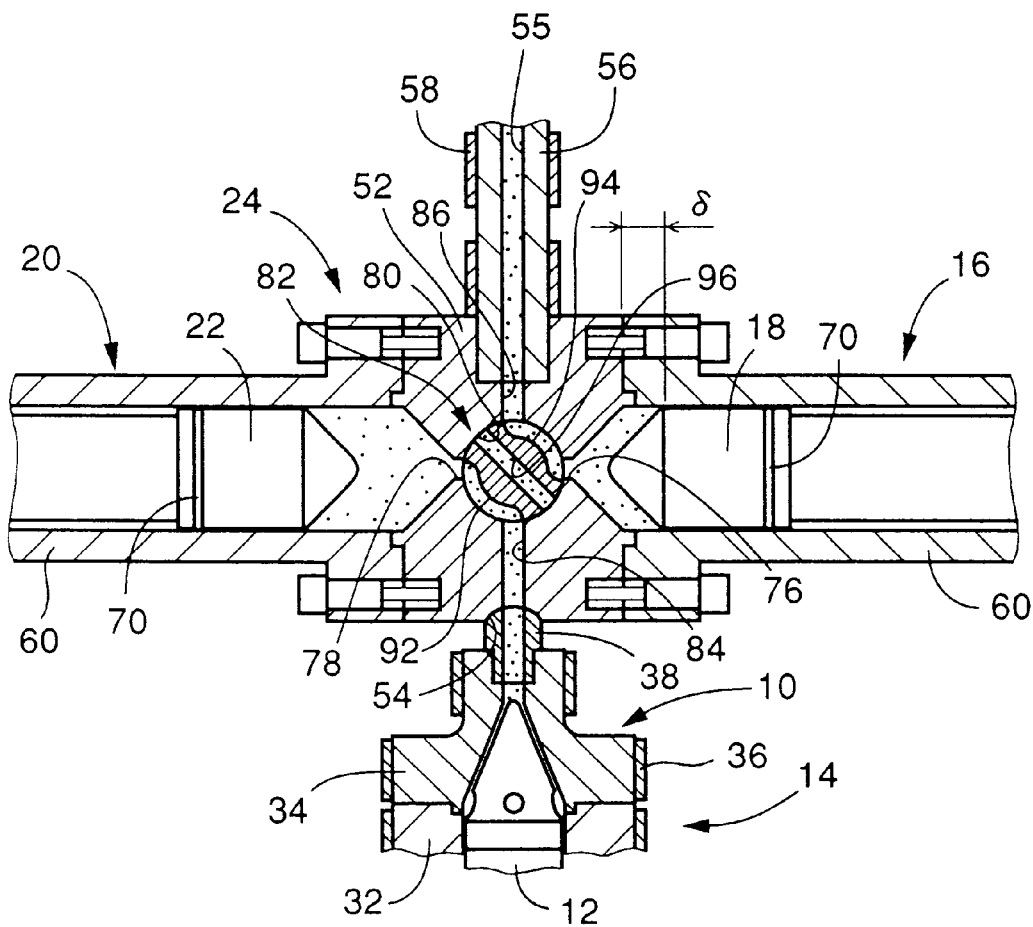
FIG. 4 is an enlarged view corresponding to that of FIG. 2, showing further step of injection molding following the step of FIG. 3.

The rotary valve 82 is rotated by 45° about its axis back to the angular position of FIG. 4, and the screw device 14 is again operated to rotate the screw 12 to resume the supply of the resin material into the second heating and injecting cylinder 20, until the the position sensor detects that the second plunger 22 has been moved to its fully retracted position. Thus, the second heating and injecting cylinder 20 stores a predetermined amount of the resin material including the surplus amount.

Figure 6:
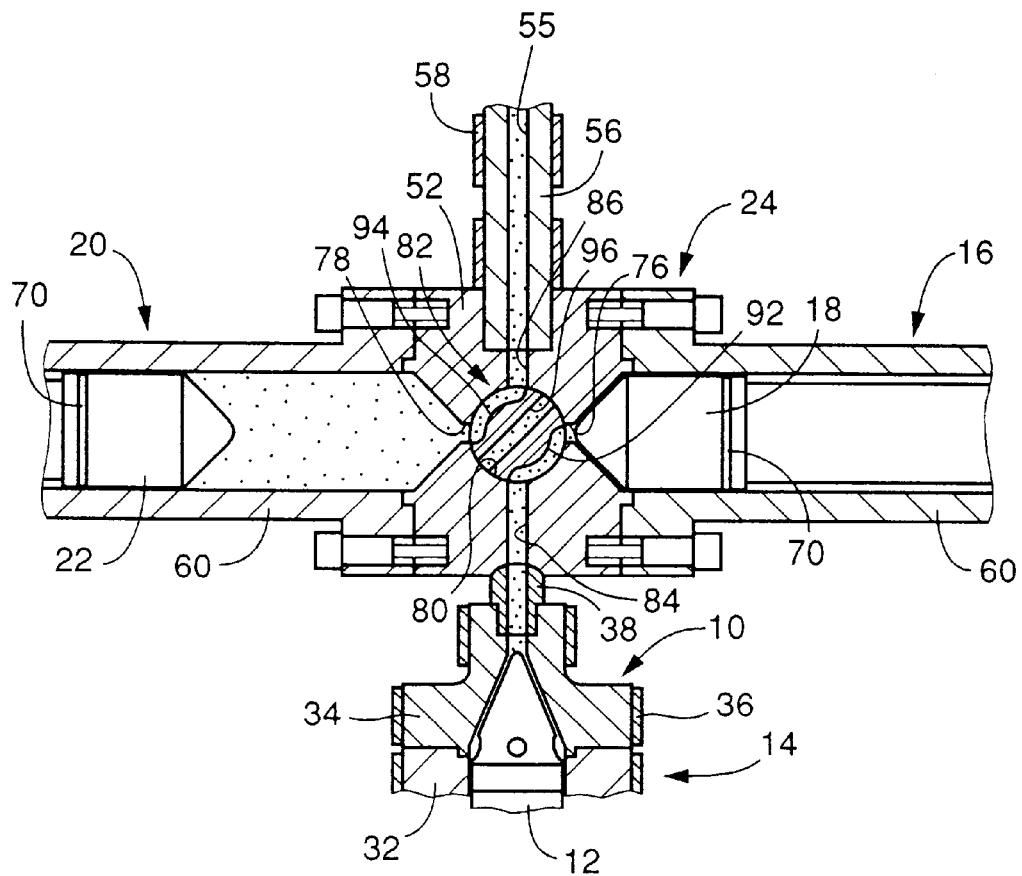
FIG. 6 is an enlarged view corresponding to that of FIG. 2, showing yet further step of injection molding following the step of FIG. 5.

The rotary valve 82 is then rotated by 90° about its axis to the angular position of FIG. 6 in which the rotary valve 82 permits the communication between the resin inlet passage 84 and the first resin flow passage 76 via its first connecting passage 92, while at the same time permitting the communication between the second resin flow passage 78 and the resin outlet passage 86 via its second connecting passage 94. In this condition, the second plunger 22 is moved by the second hydraulic cylinder mechanism toward the fully advanced portion so that the the plasticized resin material is forced and injected into the mold cavity of the mold 30 from the sprue 55 of the injection nozzle 56, through the second resin flow passage 78, second connecting passage 94 and resin outlet passage 86 in the order of the description.

While the resin material is injected from the injection nozzle 56 into the mold cavity of the mold 30, the screw device 14 is operated to rotate the screw 12 so as to plasticize and feed the resin material, so that the plasticized resin material is ejected through the nozzle member 34 of the screw device 14 and is supplied to the first heating and injecting cylinder 16 through the resin inlet passage 84 and the first resin flow passage 76 which are connected via the first circumferential connection passage 92 of the rotary valve 82. Thus, the heating and injecting cylinder 16 stores the resin material as the first plunger 18 is moved toward its fully retracted position. That is, the step of injecting the resin material into the mold cavity of the mold 30 from the second heating and injecting cylinder 20 and the step of supplying the resin material to the first heating and injecting cylinder 16 are simultaneously performed. Like the backward movement of the second plunger 22 in the resin material supplying step by the second heating and injecting cylinder 20, the backward movement of the first plunger 18 is suspended or interrupted when the plunger 18 has been moved to a predetermined supply-interrupting position, and the rotary valve 82 is rotated by 45° about its axis so as to connect the first and second heating and injecting cylinders 16, 20 via the diametrical connecting passage 96. The residual resin material remaining in the second heating and injecting cylinder 20 is transferred into the first heating and injecting cylinder 16 through the diametrical connecting passage 96. Subsequently, the rotary valve 82 is rotated by 45° about its axis so as to connect the screw device 14 to the first heating and injecting cylinder 16. The screw 14 is again operated to resume the supply of the plasticized resin material into the first heating and injecting cylinder 16 so that the predetermined amount of the resin material is stored in the first heating and injecting cylinder 16.

Repeated operation of a series of the steps as described above assures that the first and second heating and injecting cylinders 16, 20 are alternately advanced to inject the resin material into the mold cavity of the mold 30 so that a plurality of pieces of the resin product are produced while the mold 30 is repeatedly opened and closed.

In the method of injection molding according to the preferred embodiment of the present invention as described above, when the first heating and injecting cylinder 16 is operated to eject the resin material, the second heating and injecting cylinder 20 is operated to store the resin material. When the second heating and injecting cylinder 20 is operated to eject the resin material, the first heating and injecting cylinder 16 is operated to store the resin material. That is, the present method permits the resin material to be injected into the mold cavity alternately by the first and the second heating and injecting cylinders 16, 20, while the resin material is stored alternately in the two cylinders 16, 20, resulting in remarkably increased injection molding efficiency.

According to the method of injection molding of the present embodiment of the present invention, the surplus amount of the resin material which remains in one of the first and the second heating and injecting cylinders 16, 20 which has been operated to eject the resin material, is effectively transferred to the other heating and injecting cylinder which is operated to store the resin material. Thus, the conventionally experienced problem of permanent stay of some amount of the resin material in the heating and injecting cylinder is effectively eliminated. In particular, the surplus resin material is transferred into the heating and injecting cylinder which has already stored a given amount of the resin material, so that the transferred surplus resin material is stored in a position of the cylindrical member 60 which is nearest the corresponding resin flow passages 76, 78. This arrangement permits that the surplus amount of the resin material is ejected first in the next injecting operation, leading to effective reduction in the time during which the surplus resin material is stored and heated in the heating and injecting cylinder 16, 20, resulting in effective elimination of unfavorable problems such as deterioration of the quality of the resin material.

In the pre-plasticizing injection apparatus constructed according to the preferred embodiment of the present invention as described above, the screw device 14 and the plunger device 24 are movable independently of each other toward and away from the mold clamping device 26. This arrangement permits mutually independent movements to position of the screw device 14 and the plunger device 24 with respect to each other and the mold 30. Accordingly, each of the screw device 14 and the plunger device 24 can be easily and quickly moved by a relatively small driving force, and can be easily and precisely positioned at its nozzle portion with respect to the other device and the mold 30. Moreover, the apparatus can be easily accessed for inspection and repair by moving the screw device 14 and the plunger device 24 away from each other. Accordingly, the injection apparatus according to the present embodiment exhibits an excellent operating efficiency. In particular, the first and second heating and injecting cylinders 16, 20, and the heat-plasticizing cylinder 10 of the screw device 14 are arranged such that the first and second heating and injecting cylinders 16, 20 are opposite to each other and are coaxial with each other in parallel with a straight line which is perpendicular to the axis of the heat-plasticizing cylinder 10 of the screw device 14. In this arrangement, these three heating cylinders 10, 16, 20 are disposed in the same horizontal plane, providing an ample space around each of these cylinders 10, 16, 20, for easy handling of the apparatus.

As the screw device 14 of the injection apparatus constructed as described above, an in-line screw type injection device which is conventionally used in an injection molding apparatus can be employed. In this case, the pre-plasticizing injection apparatus according to the present invention can be easily provided by simply adding the plunger device 24 to the in-line screw type injection device.

Moreover, the use of the in-line screw type injection device having a screw reciprocally movable as the screw device 14 allows a known in-line screw type injecting operation without using the first and the second heating and injecting cylinders 16, 20, by removing the plunger device 24 and directly connecting the nozzle member 34 of the heat-plasticizing cylinder 10 to the mold 30 fixed to the mold clamping device 26, or by connecting the resin inlet passage 84 and the resin outlet passage 86 by the diametrical connecting passage 96 of the rotary valve 82 disposed within the plunger device 24.

In the pre-plasticizing injection apparatus according to the present invention, the heat-plasticizing cylinder 10, the first and the second heating and injecting cylinders 16, 20, and the nozzle 56 are arranged such that axes of these elements intersect at right angles at a single point in a plane. This arrangement is effective to shorten the flow passages, and permits switching connection of the flow passages by the single rotary valve 82 which is disposed at the point of intersection.

While the present invention has been described in detail in its presently preferred embodiment by reference to the accompanying drawings, for illustrative purpose only, it is to be understood that the invention is not limited to the details of the illustrated embodiment.

In the preferred embodiment of the present invention described above, the resin material is stored in one of the two heating and injecting cylinders, while at the same time it is ejected from the other heating and injecting cylinder through the injection nozzle. However, depending upon the volume of a mold cavity of a mold, the resin material may be stored in two or more heating and injecting cylinders, while it is ejected from the other two or more heating and injecting cylinders through the injection nozzle. In this case, the number of the heating and injecting cylinders used for storing and ejecting the resin material may be determined depending upon the volume of the cavity of the mold. Thus, the pre-plasticizing injection apparatus of the present invention can be easily adjustable in the amount of the resin material to be injected, depending upon the volume of the mold cavity of the particular mold.

While the rotary valve is used as the switching valve device to selectively connect the first and second heating and injecting cylinder 16, 20 to the nozzle member 34 of the screw device 14 and the injection nozzle 56 in the illustrated embodiment, a plurality of check valves and shut-off valves disposed in the respective flow passages may preferably be employed as the switching valve device.

Various kinds of driving mechanisms such as a hydraulic cylinder, an electric motor and a hydraulic motor, can be used as driving means for driving the screw device 14 and the plunger device 24 toward and away from the mold-clamping device 26, and for rotating the rotary valve means 82.

While the plunger device 24 is supported by the tie rods 48 of the mold clamping device 26 in the illustrated embodiment, the plunger device 24 may be supported by a slide movably disposed on the base of the apparatus. The plunger device 24 may also be fixed to the screw device 14.

It is to be understood that the present invention may be embodied with various other changes, modifications and improvements, which may occur to those skilled in the art, in the light of the foregoing teachings, without departing from the spirit and scope of the invention defined in the following claims.

What is claimed is:

1. A pre-plasticizing injection apparatus operated with a mold clamped by a mold clamping device comprising:

a screw device movable toward and away from said mold clamping device and including a heat-plasticizing cylinder having a center bore to which a resin material is supplied, and a screw which extends through said center bore of said heat-plasticizing cylinder such that said screw is rotated to feed said resin material to one of opposite axial ends of said heat-plasticizing cylinder such that said resin material is heated and thus plasticized within said center bore of said heat-plasticizing cylinder, and the plasticized resin material is ejected from said one axial end of said heat-plasticizing cylinder;

a plunger device movable toward and away from said mold clamping device and including a plurality of heating and injecting cylinders each having a center bore and a plunger axially slidably received in said center bore, and an injection nozzle which is connectable at one of opposite end portions thereof to said mold, each of said plurality of heating and injecting cylinders being operated to store therein said resin material plasticized by said screw device by a retracting movement of the corresponding plunger, and to eject said resin material stored therein, through said injection nozzle, by an advancing movement of the corresponding plungers toward one of opposite axial ends of the corresponding heating and injecting cylinder; and a switching valve device which permits said screw device to be connected to at least one of said plurality of said heating and injecting cylinders so that said resin material ejected from said screw device is supplied into and stored in said at least one of said heating and injecting cylinders, while at the same time permitting said injection nozzle to be connected to at least one of the rest of said plurality of heating and injecting cylinders which is not connected to said screw device so that said resin material stored in said at least one of said rest of said plurality of heating and injecting cylinders is injected through said injection nozzle, wherein said plunger device further has a communication passage which permits temporary communication between said at least one of said plurality of heating and injecting cylinders which has been operated to eject said resin material stored therein and said at least one of said rest of said plurality of heating and injecting cylinders which is to be operated to eject said resin material, so that said resin material is transferable between said plurality of heating and injecting cylinders communicated with each other by said communication passage.

2. A pre-plasticizing injection apparatus according to claim 1, wherein said screw of said screw device is a reciprocating screw which is reciprocally movable in an axial direction thereof.

3. A pre-plasticizing injection apparatus according to claim 2, wherein said plunger device is removable alone away from said mold clamping device and said screw device, and said heat-plasticizing cylinder of said screw device is connectable directly to said mold with said plunger device removed, so as to provide an injection apparatus of in-line screw type.

4. A pre-plasticizing apparatus according to claim 2, wherein said communication passage permits communication between said screw device and said injection nozzle, so that an injection molding operation is performed without using said plurality of heating and injecting cylinders of said plunger device.

5. A pre-plasticizing injection apparatus according to claim 1, wherein said screw device and said plunger device are movable independently of each other toward and away from each other and said mold clamping device.

6. A pre-plasticizing injection apparatus according to claim 1, wherein said heat-plasticizing cylinder of said screw device is disposed such that an axis of said heat-plasticizing cylinder is parallel to a direction of movement of said screw device relative to said mold clamping device, and said plurality of heating and injecting cylinders of said plunger device consist of a first heating and injecting cylinder and a second heating and injecting cylinder which are disposed coaxially with each other such that axes of said first and second heating and injecting cylinders are perpendicular to a direction of movement of said plunger device relative to said mold clamping device, said plunger device having a first and a second resin flow passage which communicate with said first and second heating and injecting cylinders, respectively, each of said first and second resin flow passages being formed at said one of said opposite axial ends of the corresponding heating and injecting cylinder, said plunger device further having a resin inlet passage for communicating with said screw device, and a resin outlet passage communicating with said injection nozzle, said first and second resin flow passages, said resin inlet passage and said resin outlet passage being arranged so as to extend along respective radial lines which intersect each other at a single point of intersection, said switching valve device comprising a rotary valve which is rotatable about an axis of rotation thereof passing said point of intersection, so as to alternatively connect said resin inlet passage to one of said first and second resin flow passages, while alternatively connecting said resin outlet passage to the other one of said first and second resin flow passages, depending upon an angular position of said rotary valve about its axis.

7. A pre-plasticizing injection apparatus according to claim 1, wherein said screw device further includes a check valve disposed near said one of said opposite axial ends of said heat-plasticizing cylinder.

8. A method of performing successive injection molding operations using a pre-plasticizing injection apparatus according to claim 1, comprising the steps of:

supplying said resin material from said heat-plasticizing cylinder of said screw device to said at least one of said plurality of heating and injecting cylinders so as to store said resin material therein; and injecting said resin material from said at least one of said rest of said plurality of heating and injecting cylinders into said mold, said steps of supplying and injecting said resin material being simultaneously performed such that each of said plurality of heating and injecting cylinders which has been operated to store said resin material is then operated to inject said resin material into said mold.

9. A method of performing successive injection molding operations using a pre-plasticizing injection device according to claim 1, comprising the steps of:

supplying said resin material from said heat-plasticizing cylinder of said screw device to said at least one of said plurality of heating and injecting cylinders so as to store said resin material therein;

injecting said resin material from said at least one of said rest of said plurality of heating and injecting cylinders into said mold; and transferring a surplus amount of said resin material remaining in the heating and injecting cylinder which has been operated to inject said resin material into said mold, to the heating and injecting cylinder which is currently used to store said resin material, through said communication passage, said steps of supplying and ejecting said resin material being simultaneously performed such that each of said plurality of heating and injecting cylinder which has been operated to store said resin material is then operated to inject said resin material into said mold, said step of transferring said resin material being performed after said step of injecting said resin material is completed.

* * * * *